United States Patent [19]

Glessner et al.

[11] Patent Number: 4,636,236
[45] Date of Patent: Jan. 13, 1987

[54] METHOD FOR PRODUCING A PREFORM FOR DRAWING OPTICAL FIBERS

[75] Inventors: Bertram Glessner, Düsseldorf; Paul Pitsch, Monchen-Gladbach; Peter Heinen, Waldfeucht; Hartmut Peglow, Willich, all of Fed. Rep. of Germany

[73] Assignee: AEG-Telefunken Kabelwerke AG, Rheydt, Monchen-Gladbach, Fed. Rep. of Germany

[21] Appl. No.: 737,262

[22] Filed: May 23, 1985

[30] Foreign Application Priority Data

May 26, 1984 [DE] Fed. Rep. of Germany ....... 3419836
Dec. 22, 1984 [DE] Fed. Rep. of Germany ....... 3447082

[51] Int. Cl.⁴ .......................................... C03B 37/023
[52] U.S. Cl. ........................................ 65/3.12; 65/13
[58] Field of Search ...................... 65/2, 13, 3.11, 3.12

[56] References Cited

U.S. PATENT DOCUMENTS

| | | | |
|---|---|---|---|
| 4,121,919 | 10/1978 | Sergent et al. | 65/3.12 |
| 4,251,251 | 2/1981 | Blankenship | 65/3.12 |
| 4,486,214 | 12/1984 | Lynch et al. | 65/3.12 |
| 4,505,729 | 3/1985 | Matsumura et al. | 65/3.11 |
| 4,551,162 | 11/1985 | Hicks | 65/4.2 |

Primary Examiner—Robert Lindsay
Attorney, Agent, or Firm—Spencer & Frank

[57] ABSTRACT

A process is disclosed for making a preform from which optical fibers may be drawn, comprising forming a tubular glass body having a hollow center and concentric layers, at least one layer being a doped layer, and each layer having different indices of refraction. A partial vacuum is formed within the interior of the tubular glass body, at least part of the glass body is softened by heating, and the softened portions of the tubular glass body are collapsed to form a preform. The pressure of the partial vacuum is selected to effectively eliminate a dip in the index of refraction of any glass fiber drawn from the preform.

21 Claims, 12 Drawing Figures

Prior Knowledge

METHOD FOR PRODUCING A PREFORM FOR DRAWING OPTICAL FIBERS

BACKGROUND OF THE INVENTION

The present invention relates to a method for producing an optical fiber by first producing a tubular glass body having concentric regions of different indices of refraction and drawing the glass body into a glass fiber.

Optically conductive glass fibers are drawn from preforms. According to the CVD [chemical vapor deposition] process, a tube comprising a glass jacket is coated with a glass core in its interior. The glass core is composed, in particular, of silicon dioxide ($SiO_2$) doped with germanium dioxide ($GeO_2$), and has a higher index of refraction than the glass jacket. With the OVD [outside vapor deposition] process, it is also possible to first coat a rod-shaped form with a doped glass core and then coat the glass core with a glass jacket, and ultimately removing the mandrell. In both cases, a tubular glass body is obtained, in some cases after vitrifying the applied layers. The tubular glass body is then heated, beginning at one end and progressing along its length, until the softening point is reached and the softened tube collapses into a solid body. The collapsing may be a separate process step or may be effected together with drawing the fiber.

In the glass core, particularly when doped with $GeO_2$, an annoying dip in the index of refraction has been observed in its central region. This dip is the result of the high heat required in the collapsing and fiber drawing steps, which causes $GeO_2$ to be evaporated, primarily from the tube's interior surface. Consequently, a central region poorer in $GeO_2$ is produced in the collapsed core. Such a dip in refractive index, originally produced in the preform, is then also present, in a geometrically equivalent shape, in the drawn optical fiber.

This undesirable dip in the index of refraction, depending on its size, produces the following disadvantageous physical effects in:

Multimode graded Index fibers:
  reduction of coupling efficiency;
  reduction of transmission bandwidth;
  error interpretation in the DMD [Differential Mode Delay] measuring method;
  negative influence on the concatinations factor in large optical fiber path lengths; and
  sensitivity of bandwidth measurement with respect to launching conditions and microbending effects Monomode fibers:
  increase of microcurvature sensitivity
  influence on cut off wavelength In spite of numerous experiments, it has not been possible in the past to completely avoid the refractive index dip; it was merely possible to reduce it. One prior art method achieved a small reduction of the refractive index dip by precollapsing the initially larger interior diameter of the coated tube to form a hollow center space of lesser diameter. After this reduction in size, the $GeO_2$ deficient inner surface layer was removed by etching. This precollapsing and etching process was performed until the smallest possible inner diameter remained, such that during the subsequent final collapsing step only a relatively small percentage of $GeO_2$ deficient area remained to produce a small dip zone. Another known method for reducing the dip is to add germanium containing substances during the collapsing step to counteract the $GeO_2$ reduction.

SUMMARY OF THE INVENTION

The known methods for reducing the dip are complicated and not fully satisfactory since a small residual dip in refractive index cannot be avoided. It is, therefore, an object of the present invention to develop a process for the production of optical fibers which avoids the dip as completely as possible.

This is accomplished in the present invention by collapsing the tubular glass body to make a preform and by maintaining a subatmospheric pressure (partial vacuum) in the interior of the tubular glass body during collapsing, with the reduced pressure being selected such that the finished glass fiber has essentially no dip in refractive index.

The present invention is based on our discovery that the dip can be avoided by selecting an appropriate subatmospheric pressure to be maintained within the tubular glass body. In some embodiments, the heating and drawing is conducted within an environment of subatmospheric pressure, with the pressure within the glass tube even further reduced.

In addition, care is preferably taken that the glass fiber produced according to the present invention has a cross section that is as circular as possible. This is accomplished, according to a further feature of the invention, preferably by making the tubular glass body sufficiently mechanically stable by precollapsing that, during the subsequent fiber drawing step at subatmospheric pressure, no glass fiber is produced which has an elliptical cross section. For this purpose, the tubular glass body, before the fiber is drawn, must have the corresponding geometry; for example, it should have a correspondingly small inner diameter or a correspondingly small ratio of inner diameter to outer diameter.

This ratio depends viscosity of the cladding material and of the composition of the core glass and is also correlated with the used low pressure.

The optimum ratio of inner to outer diameter, to prevent an elliptical core area, can be find out by simple experiments.

The process according to the present invention brings the surprising result that the creation of a dip during processing, and the dip itself, can be completely avoided, or avoided to the extent that the resulting fiber has satisfactory optical characterisitics. The optical characteristics of fibers prepared by this process are significantly better than those of fibers produced by prior art methods. The subatmospheric pressure (partial vacuum) maintained in the interior of the glass body may be of any effective value; in practice, the pressure is reduced only to the point where it is assured that formation of a dip in refractive index will not occur.

The required minimum pressure reduction depends on the type of materials used for the preform, particularly the doping substances. Optimum pressure values for each respective case can be determined by conducting simple experiments. For example, by collapsing a test preform under varying pressures along its length, and by measuring the refractive index of the various regions in the fiber, the pressure at which the dip disappears or becomes unnoticeably small can be determined.

An additional significant advantage of the present invention is that with the use of subatmospheric pressure, the glass tube collapses more quickly than in the prior art processes. The faster collapse itself has the advantage that the period of heating, which is required for the collapsing step and is a contributory cause of the dip in refractive index, can be shortened.

According to the process of the present invention, the tubular glass body may be collapsed over its entire length or only over part of its length. The collapsing occurs in such a manner that the tubular glass body collapses to form a solid rod or a tubular glass body having a smaller diameter open center.

In another embodiment the tubular glass body may be sealed at one end, thus being completely collapsed at that end. A vacuum is then generated within the tubular glass body, after which the open end of the tubular glass body is sealed. Before the drawing step, the glass tube that is now sealed at both ends is either directly drawn to form a glass fiber or is collapsed to form a rod or hollow preform from which a glass fiber may be drawn.

According to another embodiment of the invention, the tubular glass body is precollapsed at atmospheric pressure before the step of further collapsing at subatmospheric pressure. In this case a doping layer that is deficient in doping material may be present in the glass tube before collapsing at subatmospheric pressure; the deficient doping layer, if present, is removed before further collapsing. It is preferred, however, that the creation of a deficient doping layer in the glass tube is prevented before collapsing at subatmospheric pressure.

In the process of the invention, the reduced pressure is normally set with respect to atmospheric pressure. Preferably, however, in the case of collapsing under subatmospheric pressure, the reduced pressure in the interior is lower than the pressure acting on the outer wall of the tubular glass body.

The present invention is of general applicability so that it is not important, for example, whether the region having the varying index of refraction is produced by internal or external deposition process.

DETAILED DESCRIPTION OF THE EMBODIMENTS

The present invention will now be described in connection with various embodiments.

Figure 1:
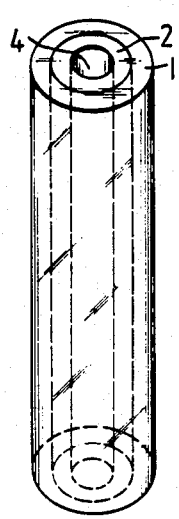
FIG. 1 is a top isometric view of a layered glass tube having a hollow center according to the invention.

The tubular glass body shown in FIG. 1 is composed of an outer jacket layer 1, made essentially of pure $SiO_2$ glass and an inner core layer 2, made essentially of $SiO_2$ glass doped with $GeO_2$. The $GeO_2$ content increases toward the center, so that the desired gradient profile of the index of refraction is produced according to an exponential curve in the core of the glass fiber to be drawn (see FIG. 9).

Figure 2:
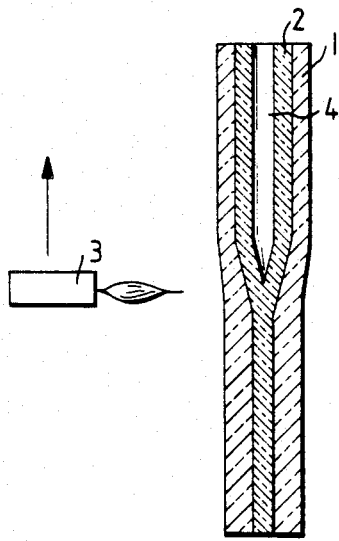
FIG. 2 is a sectional side view of a layered glass tube being collapsed as a heat source moves along its length.
Figure 3:
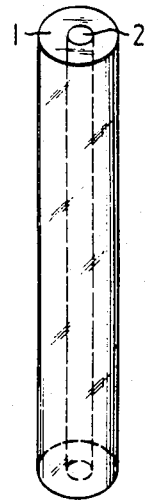
FIG. 3 is an isometric top view of the layered glass tube of the invention after having been collapsed.

As shown in FIG. 2, a burner 3 is used to heat the tubular body until it reaches the softening point and collapses in the heated zone. Burner 3 slowly moves along the tubular glass body in the axial direction so that finally, according to FIG. 3, a preform results that has no internal bore (solid rod). A vacuum pump maintains an absolute pressure of 400 mbar in the interior 4 of the tubular body of FIG. 2. Since, at our latitude, the atmospheric pressure is generally 1 bar, the reduction in pressure in this case, or the pressure differential, is 600 mbar. With the reduced pressure in the interior of the tubular body during the collapsing step, the creation of a dip is prevented.

Figure 4:
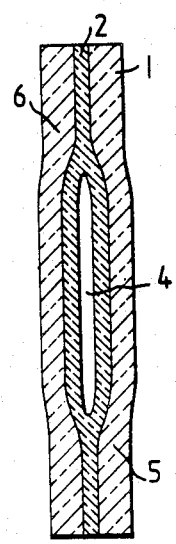
FIG. 4 is a sectional side view of the layered glass tube of the invention that has been sealed at each end by collapsing.

In another embodiment of the invention, as shown in FIG. 4, a tubular glass body comprising a core layer 2 and a jacket layer 1 is sealed at its end 5 by melting. Then a reduced pressure is created in its interior 4 and, thereafter, the opposite end 6 is also sealed.

Figure 5:
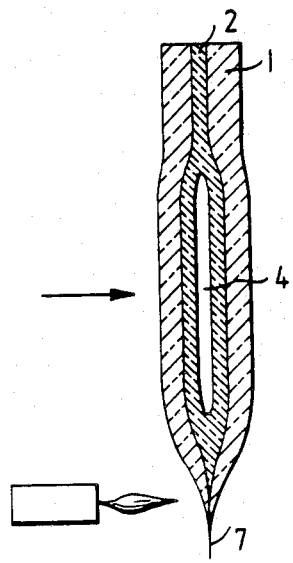
FIG. 5 is a sectional side view of the glass tube in FIG. 4, which has been heated at one end, showing an optical fiber being drawn from the heated end.
Figure 6:
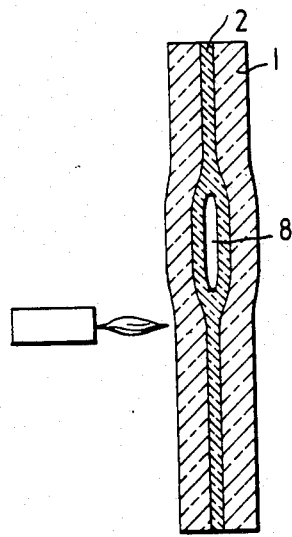
FIG. 6 is a sectional side view of the glass tube of FIG. 4, being completely collapsed before fiber drawing begins.

The glass body, which is now sealed at both ends, can either be directly drawn into a glass fiber 7, as shown in FIG. 5, or it can be completely collapsed before it is drawn into a fiber, as shown in FIG. 6. However, as shown in FIG. 6, a small cavity 8 remains in the latter method, which is caused by residual gases. According to FIG. 7, the rod of FIG. 6 is drawn into a fiber 7.

Figure 7:
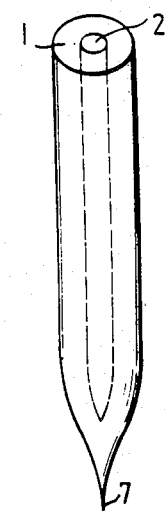
FIG. 7 is an isometric top view of the glass tube of FIG. 6, from which a fiber has begun to be drawn.

Since the collapsing step was always conducted with a reduced pressure in the interior of the glass tube, the preform of FIG. 6 as well as the glass fibers 7 of FIGS. 5 and 7 have no dips in refractive index in their centers.

In order for the tubular body not to be elliptically deformed due to the internal subatmospheric pressure, the wall thickness of the body relative to the diameter of its hollow core must be sufficiently large. Therefore, before final collapsing according to FIG. 2, a tube having a larger outer diameter and a thinner wall thickness and coated in its interior according to the VCVD (vertical chemical vapor deposition) process was initially precollapsed at atmospheric internal pressure. The resulting $GeO_2$ deficient inner layer was removed by etching. Since, during the subsequent final collapsing according to FIG. 2, an internal subatmospheric pressure of, for example, 400 mbar was maintained, no $GeO_2$ deriched internal region was able to form in the fiber.

Figure 8:
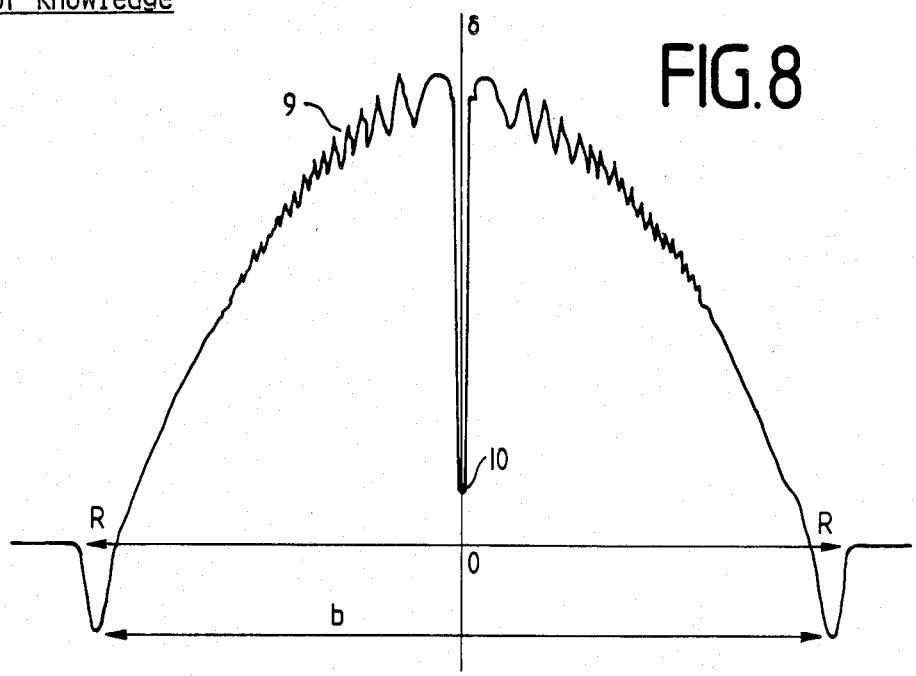
FIG. 8 is a refractive index curve for an optical fiber preform formed according to the methods of the prior art, exhibiting a dip in refractive index at the center of the fiber.

During production of the preform at atmospheric pressure in interior 4, a refractive index curve, as shown in FIG. 8, was measured over the cross section of the collapsed core 2. The difference in the refractive index compared to jacket layer 1 was plotted over the radius r of the core, which had a thickness $b = 5.5$ mm. It can be seen that the curve is typical for a gradient fiber. In the ideal case, this curve should be exponential, and both smooth and symmetrical to the center axis, with the maximum refractive index being measured in the center. The slight fluctuations 9 in the curve, which are caused by layer formation during the CVD process, are insignificant and are practically no longer noticeable in the drawn fiber, the deep dip 10 causes a considerable reduction in the transmission bandwidth of an optical fiber drawn from such a preform.

Figure 9:
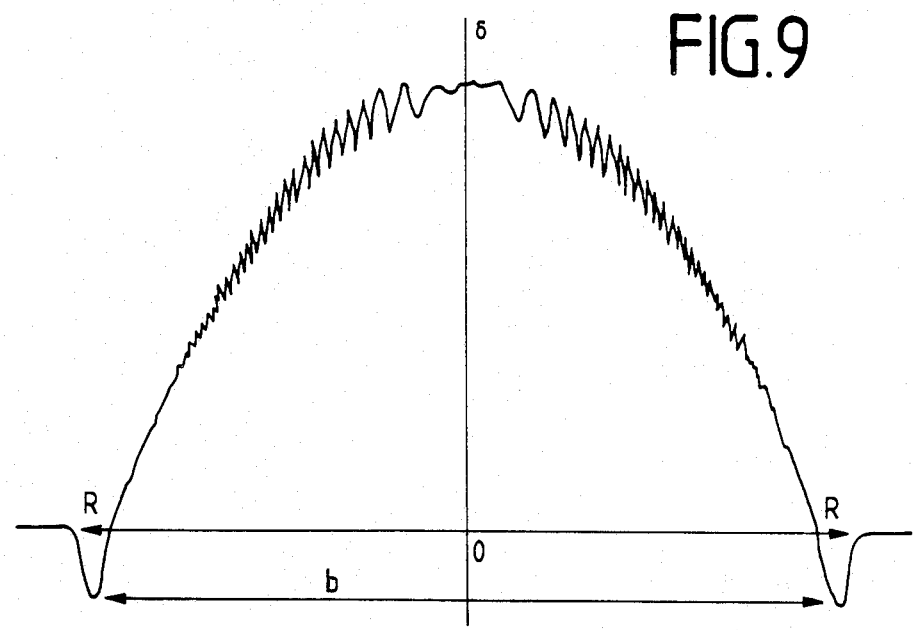
FIG. 9' is a refractive index curve for an optical fiber preform formed by the process of the invention, exhibiting the maximum refractive index at the center of the fiber.
Figure 10:
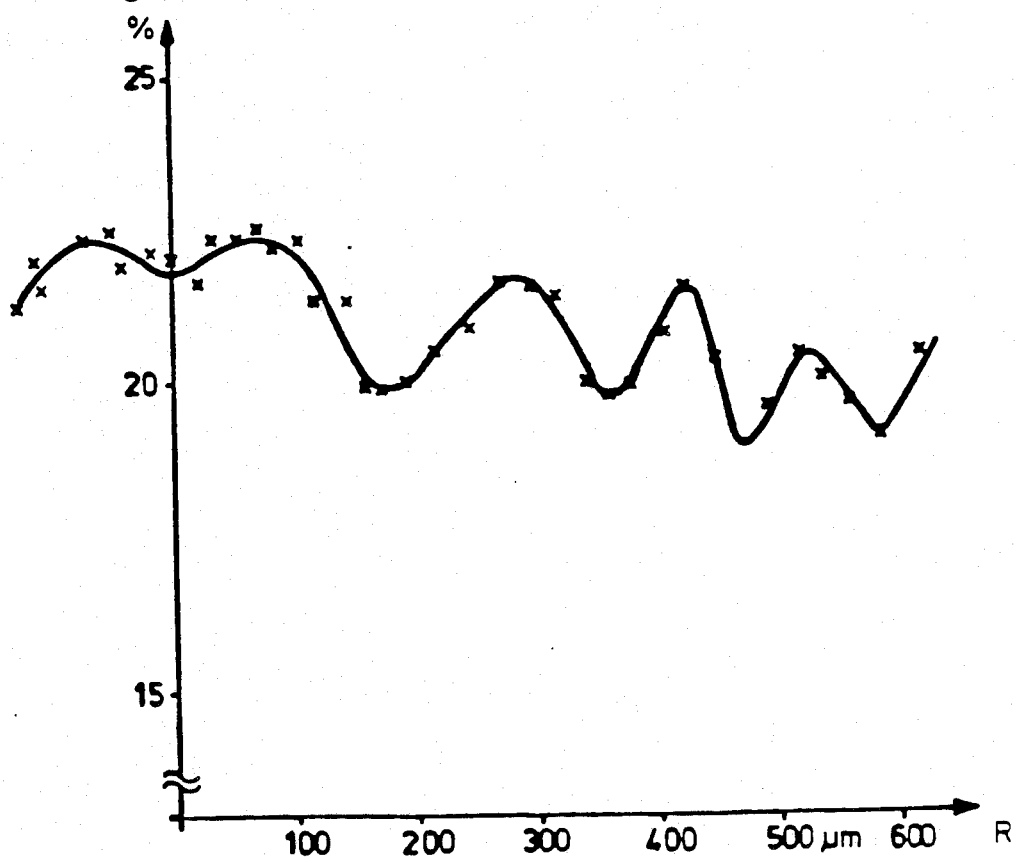
FIG. 10 shows the X-ray microanalysis of an optical fiber preform formed by the process of the invention.

A preform collapsed according to the present invention, with a reduced pressure of about 400 mbar in its interior, was characterized by the refractive index curve of FIG. 9. No dip could be found, although measurements were made at spacings of only 5 microns, which are small relative to the core thickness b of 5.5 mm. The same preform was subjected to X-ray microanalysis (RMA) to determine its $GeO_2$ content. With a resolution of the measuring device of 1 micron, no break in $GeO_2$ content was found FIG. 10. An optical fiber drawn from such a preform has an ideal refractive index curve.

The r.m.s. (root mean square) width of such a fiber is positively infected.

Figure 11:
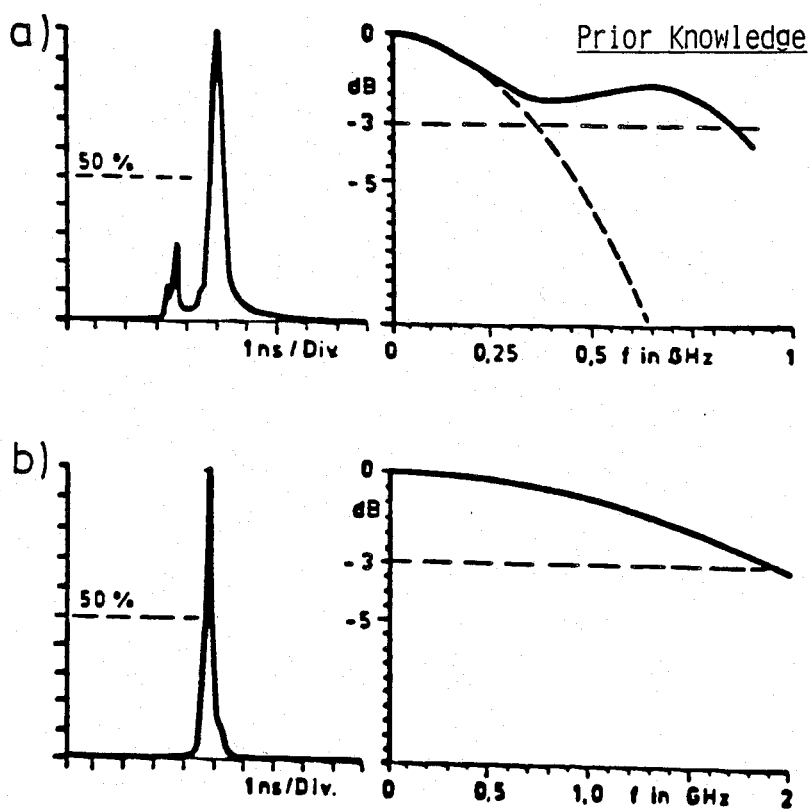
FIG. 11a is the pulse dispersion characeristic of a fiber with a central dip.
FIG. 11b is the pulse dispersion characteristic of a fiber prepared by the process of the invention.

FIG. 11 represents the impulse response of two fibers each produced with equal parameters.

The upper FIG. 11a embodies a fiber with a dip in the center; the FIG. 11b embodies a fiber treated during the collapsing according to the process invented. The distribution of the transmission function is Gaussian. The concatination factor (acc. to CCITT) is 0.5. The r.m.s. width is independent of the condition of the illumination of the fiber (i.e. full exitation and ⅔ exitation result in equal responses).

Figure 12:
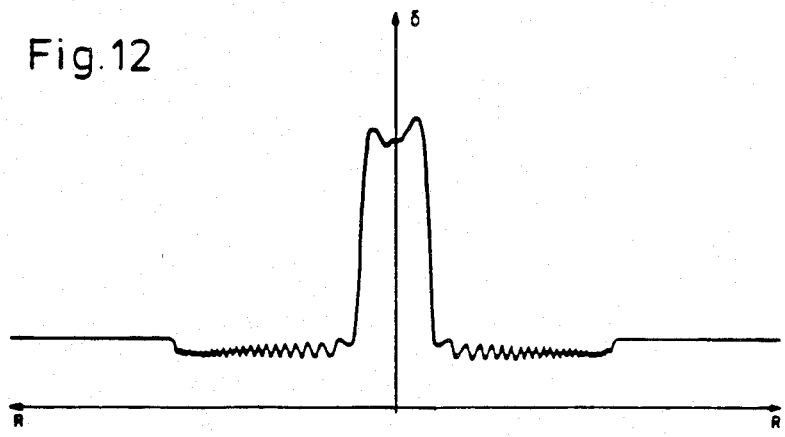
FIG. 12 is the refractive index curve for an optical fiber preform of monomode type.

FIG. 12 illustrates the effect of the invented process examplary for step-profil preforms for monomode waveguides. There is no depression in the refractive index profile calculated in the same way like in FIG. 9.

These advantageous effects are realized with surprisingly simple means. The necessary pressure reduction is not extraordinarily large and can be accomplished with simple means.

The embodiments of this invention set forth above are presented for purposes of illustration, and not limitation. The invention described herein is intended to encompass all embodiments, modifications, adaptations and equivalents within the scope of the following claims.

What is claimed is:

1. An improved process for making a preform from which optical fibers may be drawn, said preform characterized by having essentially no reduction in index of refraction in the center of an optical fiber drawn from said preform, comprising:
    forming a tubular glass body having a hollow center and at least two concentric layers, at least one interior layer being doped, each layer having an index of refraction different from each adjacent layer;
    precollapsing said tubular glass body by heating;
    applying a partial vacuum to said hollow center of said tubular glass body;
    softening at least part of said tubular glass body by heating; and
    finally collapsing the softened portions of said tubular glass body under said partial vacuum to form a preform, said partial vacuum selected to effectively eliminate a dip in index of refraction in the center of any glass fiber produced from said preform.

2. The process of claim 1, wherein the collapsed tubular glass body has an essentially circular cross section.

3. The process of claim 1, wherein the tubular glass body is precollapsed under atmospheric pressure to ensure its mechanical stability, thereby resulting in a preform having an essentially circular cross section after final collapsing.

4. The process of claim 1, wherein the tubular glass body is collapsed over its entire length.

5. The process of claim 1, wherein the tubular glass body is collpased over only part of its length.

6. The process of claim 1, wherein the tubular glass body is collapsed into a preform in the shape of a solid rod.

7. The process of claim 1, wherein the tubular glass body is collapsed into a tubular preform having a hollow center, wherein the diameter of the preform and the diameter of its hollow center are both less than the corresponding diameters in the tubular glass body.

8. The process of claim 1, wherein the tubular glass body is first collapsed at one end, thereby sealing that end; forming a partial vacuum within the interior of the tubular glass body; and, thereafter, sealing the opposite end of said tubular glass body.

9. The process of claim 8, wherein the tubular glass body sealed at both ends is drawn into a glass fiber.

10. The process of claim 8, wherein, after being sealed both ends, said tubular glass body is collapsed along essentially its entire length into a preform and, thereafter, is drawn into a glass fiber.

11. The process of claim 1, wherein the collapsed portions of the preform can be drawn into a fiber that has an essentially circular cross section.

12. The process of claim 1, wherein the tubular glass body is precollapsed under less than atmospheric pressure, a partial vacuum is created within its interior, and the precollapsed tubular glass body is further collapsed to form a preform.

13. The process of claim 1, wherein the tubular glass body has a deficient doped layer from which doping material has evaporated, and said deficient doped layer is removed before applying the partial vacuum to said hollow center of said body.

14. The process of claim 1, wherein the formation of a deficient doped layer within the tubular glass body is prevented.

15. The process of claim 1, conducted within an environment having a pressure of less than atmospheric pressure.

16. The process of claim 15, wherein the pressure within the interior of the tubular glass body is reduced with respect to the pressure acting on the outer wall of the tubular glass body.

17. The process of claim 1, wherein at least one concentric layer having a different index of refraction from that of the doped layer comprises an essentially pure $SiO_2$ glass layer.

18. The process of claim 1, wherein the doped layer is a coating layer.

19. The process of claim 18, wherein the coating layer is composed of doped silicon.

20. The process of claim 19, wherein the doped silicon comprises a doping substance selected from the group consisting of germanium dioxide, phosphorus pentoxide, and a combination of germanium dioxide and phosphorus pentoxide.

21. The process of claim 13, wherein said deficient doped layer is removed by etching.

* * * * *